United States Patent (10) Patent No.: US 8,428,124 B2
Yamasaki (45) Date of Patent: Apr. 23, 2013

(54) MOVING PICTURE ENCODING APPARATUS AND DISTRIBUTION SYSTEM

(75) Inventor: Takahiro Yamasaki, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 274 days.

(21) Appl. No.: 12/923,510

(22) Filed: Sep. 24, 2010

(65) Prior Publication Data

US 2011/0075726 A1 Mar. 31, 2011

(30) Foreign Application Priority Data

Sep. 29, 2009 (JP) ................................. 2009-225234

(51) Int. Cl.
 *H04N 7/12* (2006.01)
(52) U.S. Cl.
 USPC ...................................... 375/240.02; 375/243
(58) Field of Classification Search ........................ None
 See application file for complete search history.

(56) References Cited

U.S. PATENT DOCUMENTS

| 2004/0076332 | A1* | 4/2004 | Lin et al. ........................ 382/236 |
| 2007/0127575 | A1* | 6/2007 | Ho ............................ 375/240.16 |
| 2007/0217623 | A1* | 9/2007 | Harada ........................ 381/94.1 |
| 2008/0189073 | A1* | 8/2008 | Jagmohan et al. ............. 702/181 |

FOREIGN PATENT DOCUMENTS

JP 2007-274035 A 10/2007

OTHER PUBLICATIONS

C. Brites, F.Pereira, "Encoder Rate Control for Transform Domain Wyner-Ziv Video Coding" ICIP 2007, Sep. 2007.*
Anne Aaron, Shantanu Bane, Eric Setton, and Bernd Girod, "Transform-domain Wyner-Ziv Codec for Video." In: Proc, SPIE Visual Communications and Image Processing, San Jose, CA (2004).
M. Morbee, J. Prades-Nebot, A. Roca, A. Pizurica, and W. Philips, "Improved pixel-based rate allocation for pixel-domain distributed video coders without feedback channel", in International Conference ICIVS, Delft, The Netherlands, Aug. 2007, Proceedings Lecture Notes in Computer Science, Advanced Concepts for Intelligent Vision Systems, vol. 4678/2007, pp. 663-674, Publisher: Springer Berlin/Heidelberg.
Hashimoto, Ryoji et al.; Likelihood Estimation for Transform Domain Distributed Video Coding; The Institute of Electronics, Information and Communication Engineers Technical Report; Jan. 28, 2009; vol. 108; No. 425; pp. 31-36.
Japanese Office Action dated Jan. 15, 2013 with a partial English translation.

* cited by examiner

*Primary Examiner* — Sath V Perungavoor
*Assistant Examiner* — Kate Luo
(74) *Attorney, Agent, or Firm* — Rabin & Berdo, P.C.

(57) ABSTRACT

A moving picture encoding apparatus divides a moving picture signal into key frames and non-key frames, encodes the key frames, predicts the non-key frames from the encoded key frames, determines an encoding rate for each non-key frame, encodes each non-key frame, and outputs an error-correcting code at the encoding rate as encoded data of the non-key frame. To determine the encoding rate, parameters related to the likelihood of prediction errors are calculated by at least two different methods for each non-key frame, the parameters are compared, one of the parameters is selected, and the encoding rate is calculated from the selected parameter. The selective use of differently calculated parameters enables an efficient encoding rate to be calculated for each non-key frame and reduces the transmission of encoded data that the decoder does not need or cannot decode.

18 Claims, 17 Drawing Sheets

MOVING PICTURE ENCODING APPARATUS AND DISTRIBUTION SYSTEM

BACKGROUND OF THE INVENTION

1. Field of the Invention

The present invention relates to the encoding and decoding of moving picture sequences and is applicable in, for example, a system that uses distributed video coding techniques to distribute moving picture data.

2. Description of the Related Art

Distributed video coding (DVC) is a new coding method, based on the Slepian-Wolf and Wyner-Ziv theorems, that has attracted much recent attention. A basic DVC coding method is described by Aaron et al. in 'Transform-Domain Wyner-Ziv Codec for Video', *Proc. SPIE Visual Communications and Image Processing,* 2004. The encoder treats some frames in a received video sequence as key frames and the rest as Wyner-Ziv frames. The key frames are coded as intraframes. A discrete cosine transform (DCT) is used to transform each Wyner-Ziv frame to the coefficient domain, the coefficients are grouped into bands, the coefficients in the k-th band are quantized by a $2^{M_k}$-level quantizer, the quantized coefficients ($q_k$) are expressed in fixed numbers of bits, and the bit planes are extracted and supplied to a Slepian-Wolf encoder that uses a turbo code to produce data bits and error-correcting code bits, generally referred to as parity bits. The data bit are discarded.

The decoder decodes the key frames, uses the decoded key frames to generate a predicted image for each Wyner-Ziv frame, applies a DCT to convert the predicted image to the coefficient domain, groups the coefficients into bands, and inputs the coefficients in each band as side information to a Slepian-Wolf decoder. The Slepian-Wolf decoder uses parity bits received from the encoder to correct prediction errors in the side information by an iterative process, in which the decoder originally receives a subset of the parity bits and may request further parity bits as required. When a satisfactory decoded result is obtained, an inverse discrete cosine transform (IDCT) is applied to reconstruct the image of the Wyner-Ziv frame.

A problem with this method is that feedback from the decoder to the encoder is necessary in order to request additional parity bits. As a result, the encoder and decoder cannot operate independently, and there are inevitable delays involved with requesting and obtaining additional parity bits.

In an alternative scheme, described by Morbee et al. in 'Improved Pixel-Based Rate Allocation For Pixel-Domain Distributed Video Coders Without Feedback Channel', *ICIVS* 2007, the encoder generates a predicted image of its own for each Wyner-Ziv frame, compares this predicted image with the original image in the Wyner-Ziv frame, thereby estimates the number of parity bits that will be required for accurate decoding of the Wyner-Ziv frame, and sends this number of parity bits without having to be asked for them by the decoder. This eliminates the need for a feedback channel and avoids the delays associated with repeated requests.

To estimate the required number of parity bits, the encoder operates on the assumption that the distribution of the differences between the DCT coefficients of the original image and the predicted image can be approximately modeled by a Laplacian distribution. This model is used to estimate the decoder's prediction error probability. A conditional entropy is then calculated from the estimated error probability, and the necessary encoding rate is estimated from the conditional entropy.

Since the Laplacian model is only approximate, and since the encoder and decoder may generate somewhat different predicted images, the estimated necessary encoding rate will occasionally provide fewer parity bits than the decoder actually needs, causing the decoded image to be visibly distorted. To avoid this type of distortion, Morbee et al. have the decoder stop decoding when it reaches a bit plane that it cannot decode correctly, and use only the more significant bit planes to reconstruct the image.

A problem is that when the decoder decides that it cannot decode a particular bit plane, the encoder continues to generate and transmit parity bits for the following less significant bit planes, even though the decoder makes no use of these parity bits. This is a waste of computational resources in the encoder and communication resources on the link between the encoder and decoder.

This waste is a result of the underestimation of the necessary number of parity bits by the encoder. Particularly in a video distribution system, there is a need for an encoder that can estimate the necessary number of parity bits more accurately and generate encoded data of higher quality.

SUMMARY OF THE INVENTION

A general object of the present invention is to encode moving pictures more efficiently.

A more specific object is to determine when an encoder needs to add a supplementary rate to an estimated necessary encoding rate.

The invention provides a moving picture encoding apparatus for encoding a moving picture signal including a sequence of frames. In the moving picture encoding apparatus, a frame classifier designates each frame as a key frame or a non-key frame. A key frame encoder encodes the key frames. A side information generator uses the encoded key frame data to generate a predicted image for each non-key frame. An encoding rate estimator uses the predicted image to determine an encoding rate for each non-key frame. A non-key frame encoder then encodes each non-key frame to obtain an error-correcting code at the encoding rate determined by the encoding rate estimator, and outputs the error-correcting code as encoded data of the non-key frame.

The encoding rate estimator calculates a plurality of parameters related to the likelihood of prediction errors in the predicted image, calculating different parameters by different methods, and uses these parameters selectively to calculate the encoding rate.

In some embodiments, the parameters are entropy values. One of the calculated entropy values is selected and a correction is applied to the selected entropy value to obtain the encoding rate.

In other embodiments, the parameters are error rates. One of the calculated, error rates is selected, an entropy value is calculated from the selected error rate, and a correction is applied to the entropy value to obtain the encoding rate.

The selections may be made by use of a table.

The invention also provides a moving picture distribution system including a moving picture distribution apparatus with a moving picture encoding apparatus as described above and a moving picture receiving apparatus with a moving picture decoding apparatus for receiving and decoding the encoded key frame data and non-key frame data.

The selective use of a plurality of parameters calculated by different methods enables an efficient encoding rate to be calculated for each non-key frame. Efficient use can therefore be made of bandwidth on the communication link between the moving picture distribution apparatus and the moving picture receiving apparatus in the moving picture distribution system, because the moving picture decoding apparatus receives less encoded data that it does not need or cannot decode.

DETAILED DESCRIPTION OF THE INVENTION

Figure 1:
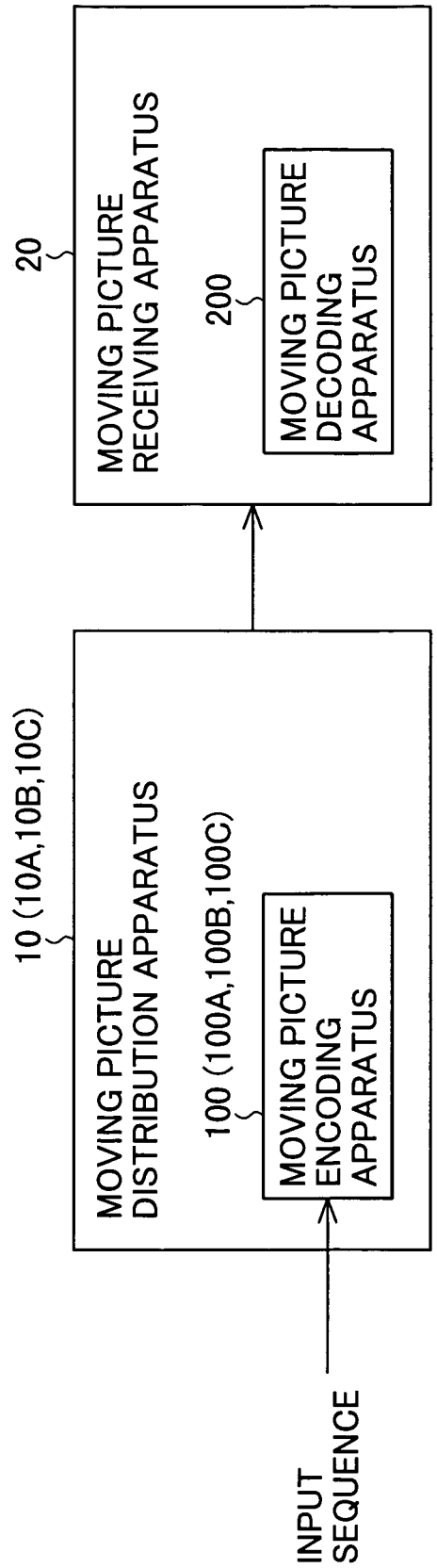
FIG. 1 is a block diagram illustrating the basic structure of a moving picture distribution system embodying the invention.

Four embodiments of the invention will now be described with reference to the attached drawings, in which like elements are indicated by like reference characters.

These embodiments concern a moving picture distribution system 1 (1A, 1B, 1C) with the basic structure shown in FIG. 1, including a moving picture distribution apparatus 10 (10A, 10B, 10C) and a moving picture receiving apparatus 20. The moving picture distribution apparatus 10 includes a moving picture encoding apparatus 100 (100A, 100B, 100C) that encodes a video signal, and a transmitter (not shown) that transmits the encoded video signal to the moving picture receiving apparatus 20. The moving picture receiving apparatus 20 includes a moving picture decoding apparatus 200 that decodes the video signal, and other apparatus (not shown) for output of the decoded signal. The type of output is not limited. Exemplary forms of output include display, writing onto a storage medium, and transmission over a communication link. The reference characters with suffixes A, B, and C are used in the second, third, and fourth embodiments.

The video signal input to the moving picture encoding apparatus 100 may be any type of video signal, digital or analog, but it will be assumed in the following description that the signal is a digital signal organized as a sequence of frames. This is the type of signal that would be received from a video camera equipped with a charge coupled device (CCD) imager. If an analog video signal is input, the moving picture encoding apparatus 100 may include a frame grabber that captures the signal by converting it to a digitized frame sequence.

The moving picture encoding apparatus 100 may be a special-purpose device or it may be a general-purpose computer having, for example, a central processing unit (CPU), read only memory (ROM), random access memory (RAM), electrically programmable and erasable read only memory (EEPROM), a hard disk, and other well known facilities for storing data and storing and executing programs, including a program that implements the functions of the moving picture distribution apparatus 10 (10A, 10B, 10C) in the embodiments described below. The invention can be practiced by installing such a program in a computer. Other programs for communication processing, data processing, and so on may also be installed as necessary.

The moving picture decoding apparatus 200 may also be either a specialized device or a general-purpose computing device equipped with specialized software, and may include a display unit for displaying the decoded video signal output by the moving picture receiving apparatus 20, or a data storage unit for storing the decoded video signal output by the moving picture receiving apparatus 20.

A detailed description of the moving picture receiving apparatus 20 will be omitted. The moving picture decoding apparatus 200 may have, for example, the structure shown by Morbee et al.

First Embodiment

Figure 2:
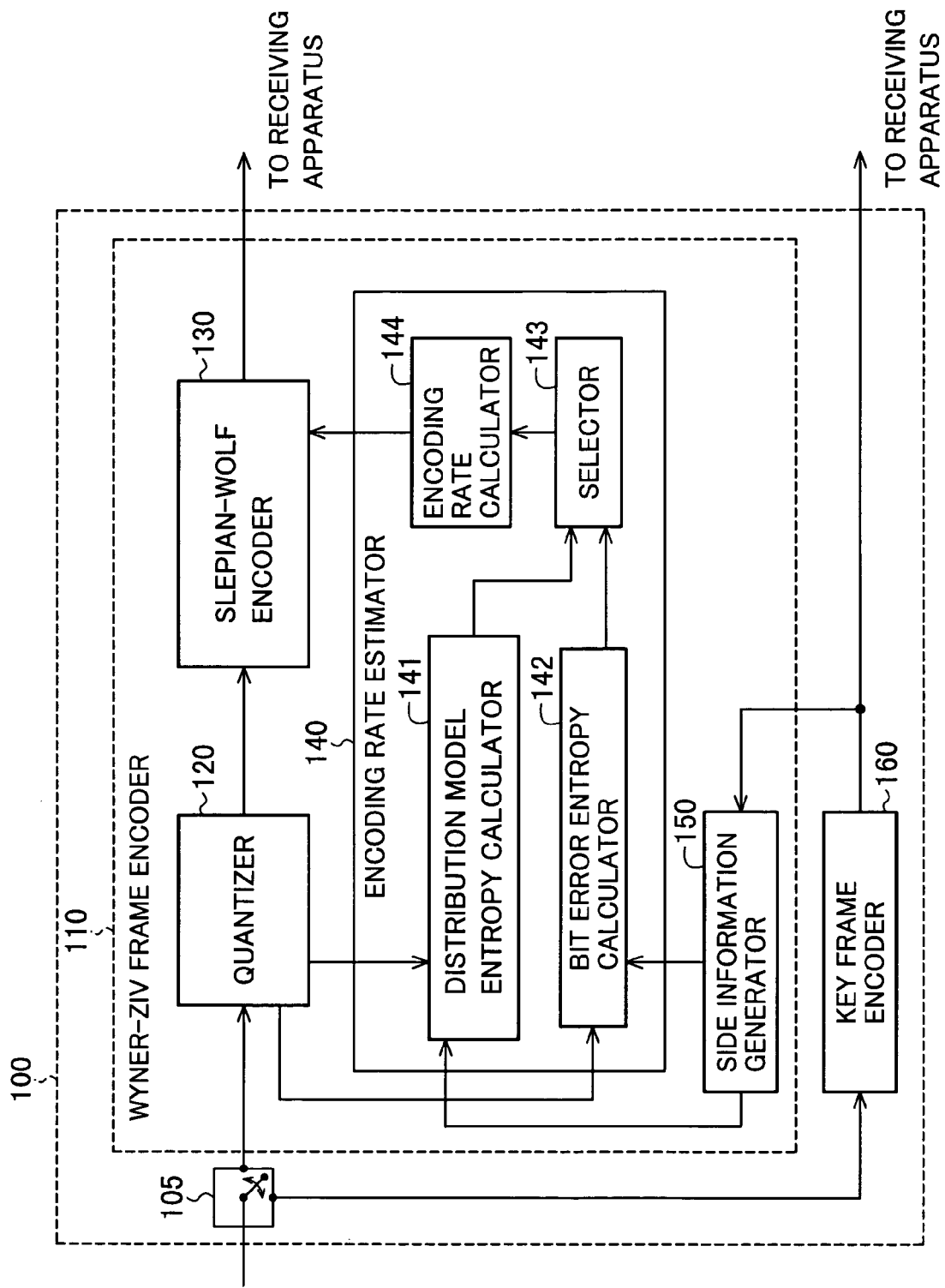
FIG. 2 is a functional block diagram illustrating the structure of a moving picture encoding apparatus in a first embodiment.

Referring to FIG. 2, the moving picture encoding apparatus 100 in the first embodiment comprises a frame classifier 105, a Wyner-Ziv frame encoder 110, and a key frame encoder 160. The frame classifier 105, shown schematically as a switch, receives the incoming frame sequence, designates each frame as a key frame or a non-key frame, sends the key frames to the key frame encoder 160, and sends the non-key frames to the Wyner-Ziv frame encoder 110. The Wyner-Ziv frame encoder 110 and key frame encoder 160 both output encoded data to the moving picture receiving apparatus 20 in FIG. 1. Non-key frames will be referred to below as Wyner-Ziv frames.

The frame classifier 105 may designate frames as key frames or Wyner-Ziv frames according to their position in the frame sequence. For example, odd-numbered frames may be key frames and even-numbered frames may be Wyner-Ziv frames. Alternatively, a scheme in which Wyner-Ziv frames occur consecutively, or key frames occur consecutively, may be used. The scheme may be selected for compatibility with existing DVC equipment.

The key frame encoder 160 receives and encodes the key frames and sends the encoded data to the moving picture receiving apparatus 20. Known intraframe coding methods such as the methods standardized by the Joint Photographic Experts Group (JPEG) or the Moving Picture Experts Group (MPEG) may be used, as taught by Aaron et al.

Distributed video coding of Wyner-Ziv frames may be carried out either in the pixel domain, by processing the pixel data directly, or in the transform domain, by first performing a transform such as a DCT, as also taught by Aaron et al. The moving picture encoding apparatus 100 will be described as operating in the transform domain, but the invention is not limited to either domain.

The Wyner-Ziv frame encoder 110 includes a quantizer 120, a Slepian-Wolf encoder 130, an encoding rate estimator 140, and a side information generator 150.

The quantizer 120 receives, transforms, and quantizes Wyner-Ziv frames, divides the quantized data into bit planes, and gives the bit planes to the Slepian-Wolf encoder 130 and encoding rate estimator 140.

The side information generator 150 generates a predicted image of a Wyner-Ziv frame from either or both of the key-frames preceding and following the Wyner-Ziv frame, transforms and quantizes the predicted image, and divides the quantized data into bit planes.

The encoding rate estimator 140 estimates an encoding rate that enables prediction errors in the input bit planes to be corrected, by using the original image of the input frame and the predicted image generated by the side information generator 150. Details will be given later.

The Slepian-Wolf encoder 130 receives quantized bit planes from the quantizer 120, performs Slepian-Wolf encoding of each bit plane by using a turbo code or a low-density parity-check (LDPC) code, for example, and sends resulting error-correcting code bits or parity bits to the moving picture receiving apparatus 20 at the encoding rate calculated by the encoding rate estimator 140. Instead of the term 'parity bits', the general term 'error-correcting code bits' will be used for uniformity below.

The encoding rate estimator 140 includes a distribution model entropy calculator 141, a bit error entropy calculator 142, a selector 143, and an encoding rate calculator 144. The basic operation of each component of the encoding rate estimator 140 is described below. Further details will be given later.

The distribution model entropy calculator 141 obtains a bit plane of the transformed original image in the Wyner-Ziv frame from the quantizer 120 and the corresponding bit plane of the predicted image from the side information generator 150, estimates the error probability of each bit in the bit plane by using a distribution model, and then calculates an entropy value.

The bit error entropy calculator 142 obtains a bit plane of the transformed original image in the Wyner-Ziv frame from the quantizer 120 and the corresponding bit plane of the predicted image from the side information generator 150, counts differences, representing prediction errors, between the two bit planes, and calculates a corresponding entropy value.

The selector 143 compares the entropy value obtained from the distribution model entropy calculator 141 with the entropy value obtained from the bit error entropy calculator 142, and decides which of the two entropy values to use to calculate the encoding rate.

The encoding rate calculator 144 uses the entropy value selected by the selector 143 to calculate the encoding rate.

Figure 4:
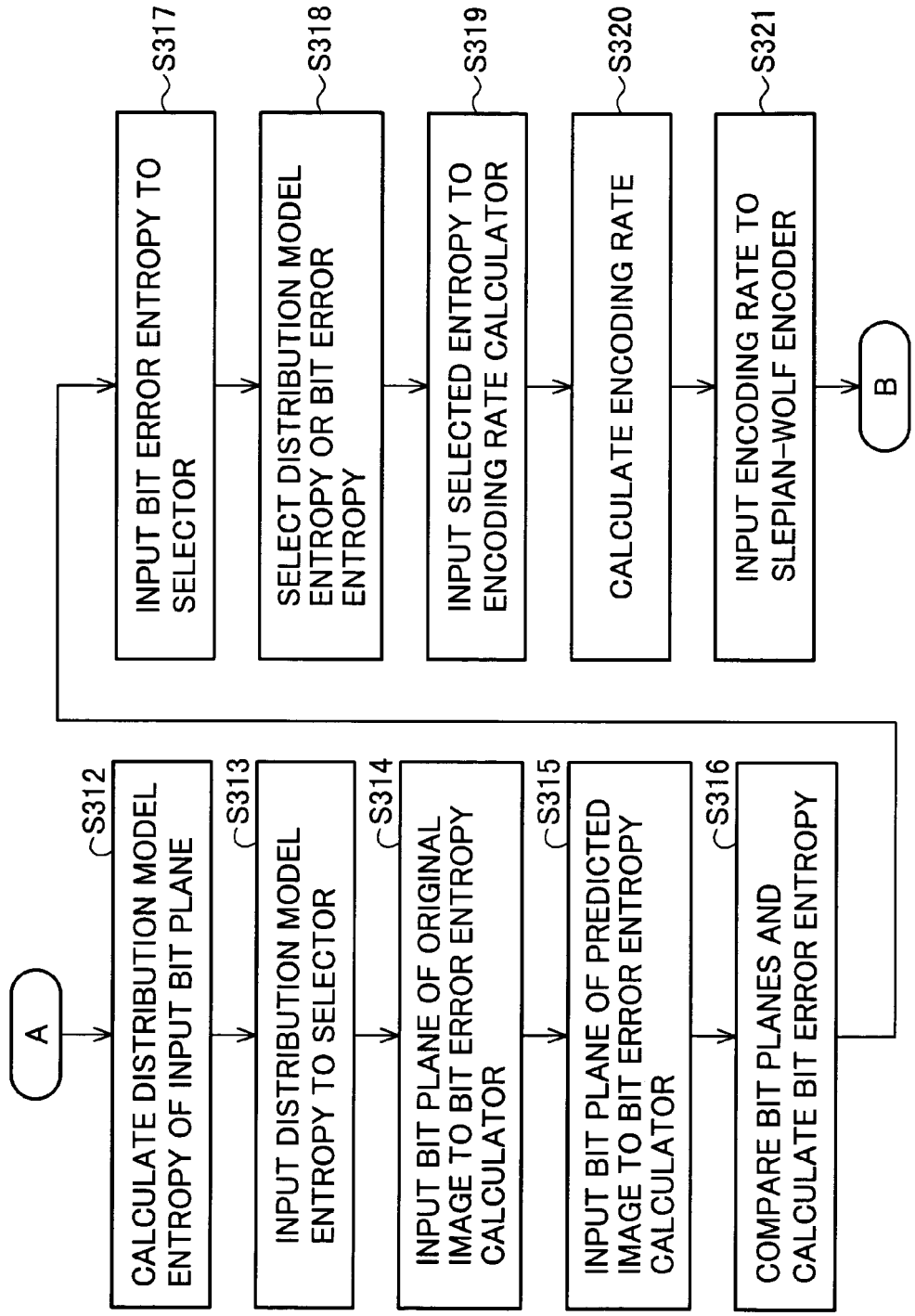
Figure 5:
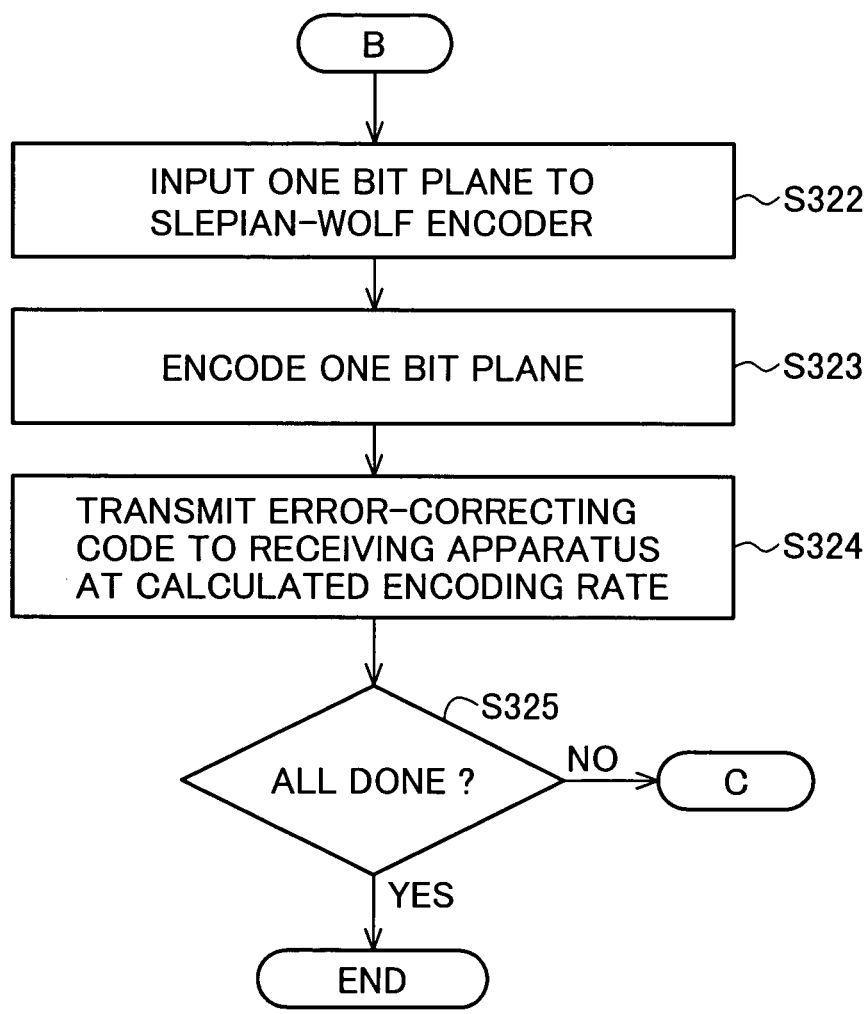

The encoding and decoding of Wyner-Ziv frames will now be described with reference to the flowchart in FIGS. 3 to 5. It will be assumed that the frame sequence consists of odd-numbered key frames, which are encoded by conventional methods, and even-numbered Wyner-Ziv frames, which are encoded as follows.

Figure 3:
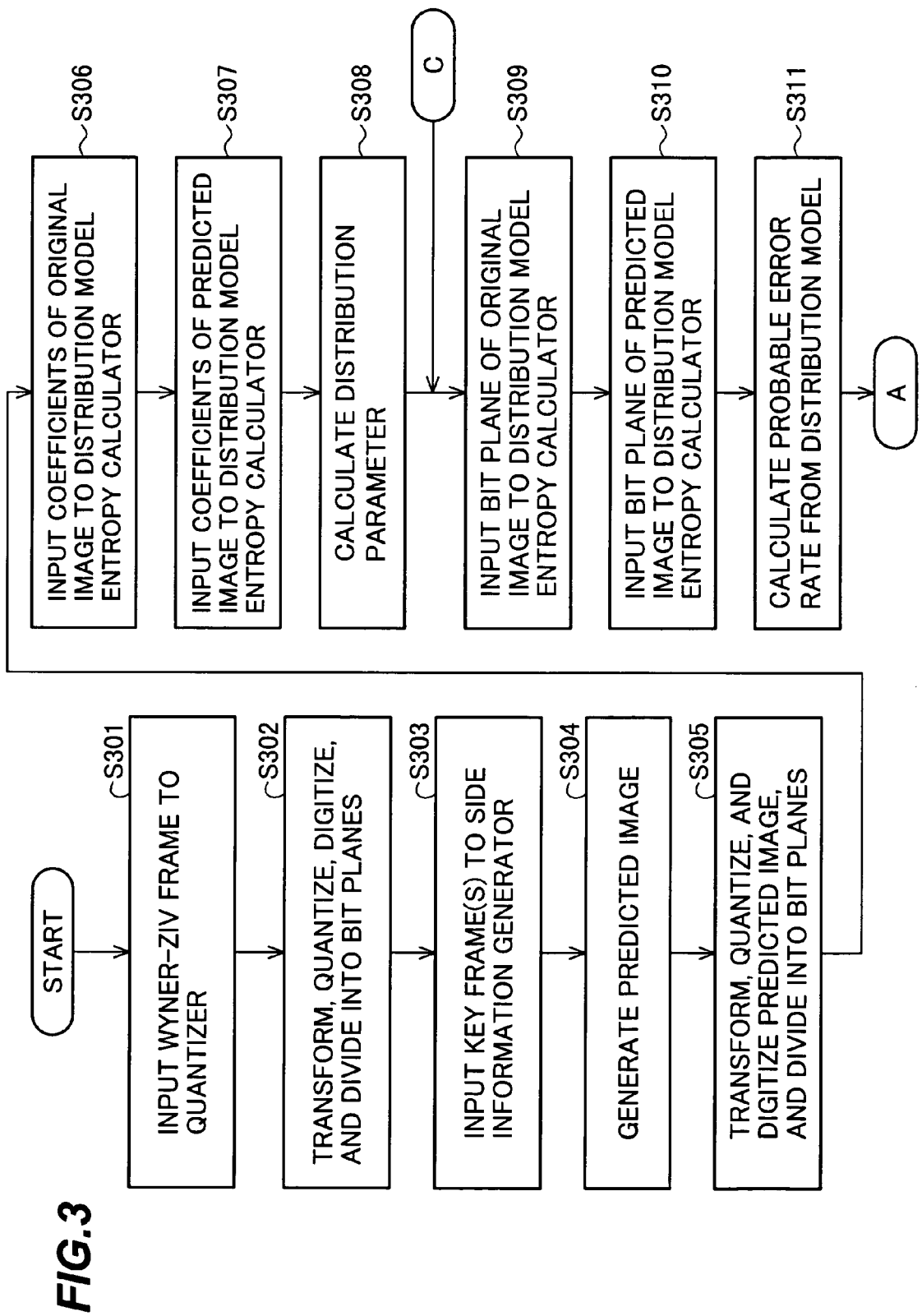
FIGS. 3 to 5 constitute a flowchart illustrating the operation of the moving image encoding apparatus in FIG. 2.

Referring to FIG. 3, when the encoding of a Wyner-Ziv frame such as the second frame begins, the frame is input to the quantizer 120 (step S301) and transformed to the coefficient domain by a DCT, and the coefficients are grouped into spatial frequency bands, quantized, and divided into bit planes (step S302). In each band, the bit planes may cover the entire area of the frame, or the frame area may be divided into sub-areas and the coefficient data corresponding to each sub-area may be divided into separate bit planes.

The image of either the preceding or following key frame or both is input from the key frame encoder 160 to the side information generator 150 (step S303) and a predicted image is generated for the Wyner-Ziv frame (step S304). The predicted image may be generated by using the preceding key frame image as the predicted image, by averaging the preceding and following key frame images, by carrying out a limited motion search, or by various other methods. The predicted image generated in the side information generator 150 is transformed and quantized, and the quantized data are divided into bit planes (step S305). The length of the bit planes in step S305 is the same as the length of the bit planes obtained by the quantizer 120.

The coefficients of the original image of the frame are input from the quantizer 120 to the distribution model entropy calculator 141 (step S306). In the next few steps, the distribution model entropy calculator 141 estimates the number of prediction errors on the assumption that the distribution of differences in coefficients between the original image and the predicted image can be approximately modeled by a Laplacian distribution, and calculates an entropy value.

First, the coefficients of the predicted image of the current frame are input from the side information generator 150 to the distribution model entropy calculator 141 (step S307).

The distribution model entropy calculator 141 calculates the parameter α of the Laplacian distribution for each band (step S308). The parameter α of the Laplacian distribution is related to the variance $\sigma^2$ of the distribution as in equation (1) below. If the mean value of the distribution is zero, the variance $\sigma^2$ can be calculated by equation (2) below, where X and Y represent coefficients derived from the original image and the predicted image, respectively, and N is the length of the bit plane.

$$\alpha^2 = \frac{2}{\sigma^2} \tag{1}$$

$$\sigma^2 = \frac{1}{N}\sum (X-Y)^2 - (\overline{X-Y})^2 = \frac{1}{N}\sum (X-Y)^2 \tag{2}$$

A bit plane of the original image is now input from the quantizer 120 to the distribution model entropy calculator 141 (step S309). The corresponding bit plane of the predicted image is input from the side information generator 150 to the distribution model entropy calculator 141 (step S310). The distribution model entropy calculator 141 first calculates a probable error rate by using the distribution model as follows (step S311).

If X is a random variable representing a coefficient of the original image and Y is a random variable representing the corresponding coefficient of the predicted image, the conditional probability distribution of Y for a given value of X can be represented by equation (3). The distribution model entropy calculator 141 calculates the probability that the nth bit in the jth bit plane (the input bit plane) of the predicted image will differ from the nth bit in the jth bit plane of the predicted image. This probability $P_r$ can be calculated from equation (4). The calculation in equation (4) is carried out for each bit in the bit plane, and the mean error probability or probable error rate $P_e$ is calculated as the average of the bit-wise entropy values $H(P_r)$ over the whole bit plane, as in equation (5).

$$P(Y|X) = \frac{\alpha}{2}\exp(-\alpha|Y-X|) \tag{3}$$

$$P_r = \frac{P(Y_j^n = 1 | X = x^n, x_j^i = 0) + P(Y_j^n = 0 | X = x^n, x_j^i = 1)}{P(Y_{j-1}^n = x_{j-1}^n | X = x^n)} \tag{4}$$

$$P_e = \frac{1}{N}\sum H(P_r) \tag{5}$$

From the probable error rate $P_e$, the distribution model entropy calculator 141 calculates the entropy $H(P_e)$ given by the equation (6) below (step S312 in FIG. 4). If the probable error rate $P_e$ is considered to represent errors in a binary symmetric channel, this entropy value $H(P_e)$, referred to below as the distribution model entropy value, represents the encoding rate needed to correct the errors.

$$H(P_e) = -P_e \log(P_e) - (1-P_e)\log(1-P_e) \quad (6)$$

The distribution model entropy value calculated by the distribution model entropy calculator 141 is input to the selector 143 (step S313).

In the next few steps, the bit error entropy calculator 142 calculates an entropy value by a method different from the distribution model method used by the distribution model entropy calculator 141, in case more errors occur than envisioned by the distribution model.

The bit plane of the original image is input from the quantizer 120 to the bit error entropy calculator 142 (step S314) and the corresponding bit plane of the predicted image is input from the side information generator 150 to the bit error entropy calculator 142 (step S315). By comparing the original image and the predicted image, the bit error entropy calculator 142 obtains a bit error count e. Dividing the bit error count e by the bit plane length N gives a bit error rate err (err=e/N). An entropy value H(err), referred to below as a bit error entropy value, is calculated as in the following equation (7) from the bit error rate err (step S316).

$$H(\text{err}) = -\text{err} \log(\text{err}) - (1-\text{err})\log(1-\text{err}) \quad (7)$$

The bit error entropy value H(err) obtained by the bit error entropy calculator 142 is input to the selector 143 (step S317).

The selector 143 compares the distribution model entropy $H(P_e)$ and the bit error entropy H(err) and decides whether the distribution model entropy provides an adequate encoding rate for decoding. If so, it selects the distribution model entropy. Otherwise, it selects the bit error entropy (step S318).

The distribution model entropy is based on an assumed general model representing an average error rate, while the bit error entropy is based on an actual comparison of the original and predicted images. If the bit error entropy is greater than the distribution model entropy, it can be inferred that more errors will occur than predicted by the distribution model, and that the distribution model entropy will not provide a sufficient encoding rate to enable the decoding apparatus to correct the errors.

The selector 143 may choose between the two entropy values on the basis of a simple comparison of their magnitudes, selecting the bit error entropy value H(err) when condition (8) below is true, and selecting the distribution model entropy value $H(P_e)$ when condition (8) is false. Alternatively, a threshold t may be established, the bit error entropy value H(err) being selected when condition (9) below is true, and the distribution model entropy value $H(P_e)$ when condition (9) is false. The threshold t may take the form of a ratio, in which case the bit error entropy value H(err) is selected when condition (10) below is true, and the distribution model entropy value $H(P_e)$ when condition (10) is false. The threshold t may be fixed or may decrease from one bit plane to the next, on the principle that uncorrected errors in higher bit planes have a greater effect on image quality than uncorrected errors in lower bit planes, and require a greater margin of safety.

$$H(P_e) < H(\text{err}) \quad (8)$$

$$H(\text{err}) - H(P_e) > t \quad (9)$$

$$H(\text{err}) / H(P_e) > t \quad (10)$$

The entropy value selected by the selector 143 is supplied to the encoding rate calculator 144 (step S319).

The encoding rate calculator 144 calculates an encoding rate from the supplied entropy value (step S320). Since the encoding rate obtained from the entropy calculations is a theoretical value, depending on the performance of the turbo decoder or LDPC decoder used in the Slepian-Wolf decoding process, an encoding rate greater than the theoretical value may be required. The encoding rate may therefore be obtained by applying a correction to the selected entropy value. In an exemplary correction method described by Morbee et al., a large number of frame sequences are encoded and decoded, the relationship between entropy and the decoded result is observed, and the entropy value is corrected according to the observed relationship. Another possible correction method adds a correction term k to the entropy, where k may be a constant value or a value that varies with each bit plane. The correction method may be changed depending on whether the selected entropy value is the distribution model entropy or the bit error entropy.

The encoding rate calculator 144 supplies the encoding rate to the Slepian-Wolf encoder 130 (step S321). The bit plane to be encoded is now input from the quantizer 120 to the Slepian-Wolf encoder 130 (step S322 in FIG. 5) and encoded (step S323), and the Slepian-Wolf encoder 130 outputs an error-correcting code at the encoding rate determined by the encoding rate estimator 140 for transmission to the moving picture decoding apparatus 200 (step S324).

The Wyner-Ziv frame encoder 110 now decides whether all bit planes of the current frame have been processed (step S325). If so, the processing of the frame ends. Otherwise, the Wyner-Ziv frame encoder 110 returns to step S309 to process the next bit plane.

In contrast to the prior art, the moving picture encoding apparatus in the first embodiment compares a plurality of calculated parameters, in this case entropy values, and selects the optimal parameter, which is then used to determine the encoding rate. An encoding rate adequate for decoding can therefore be obtained even when no single calculation method, such as the conventional distribution model, is able to estimate prediction errors reliably. Accordingly, the number of frames in which the decoder is unable to correct prediction errors is reduced, which improves the quality of the decoded moving picture and uses the transmitted error correcting code more effectively.

Second Embodiment

Figure 6:
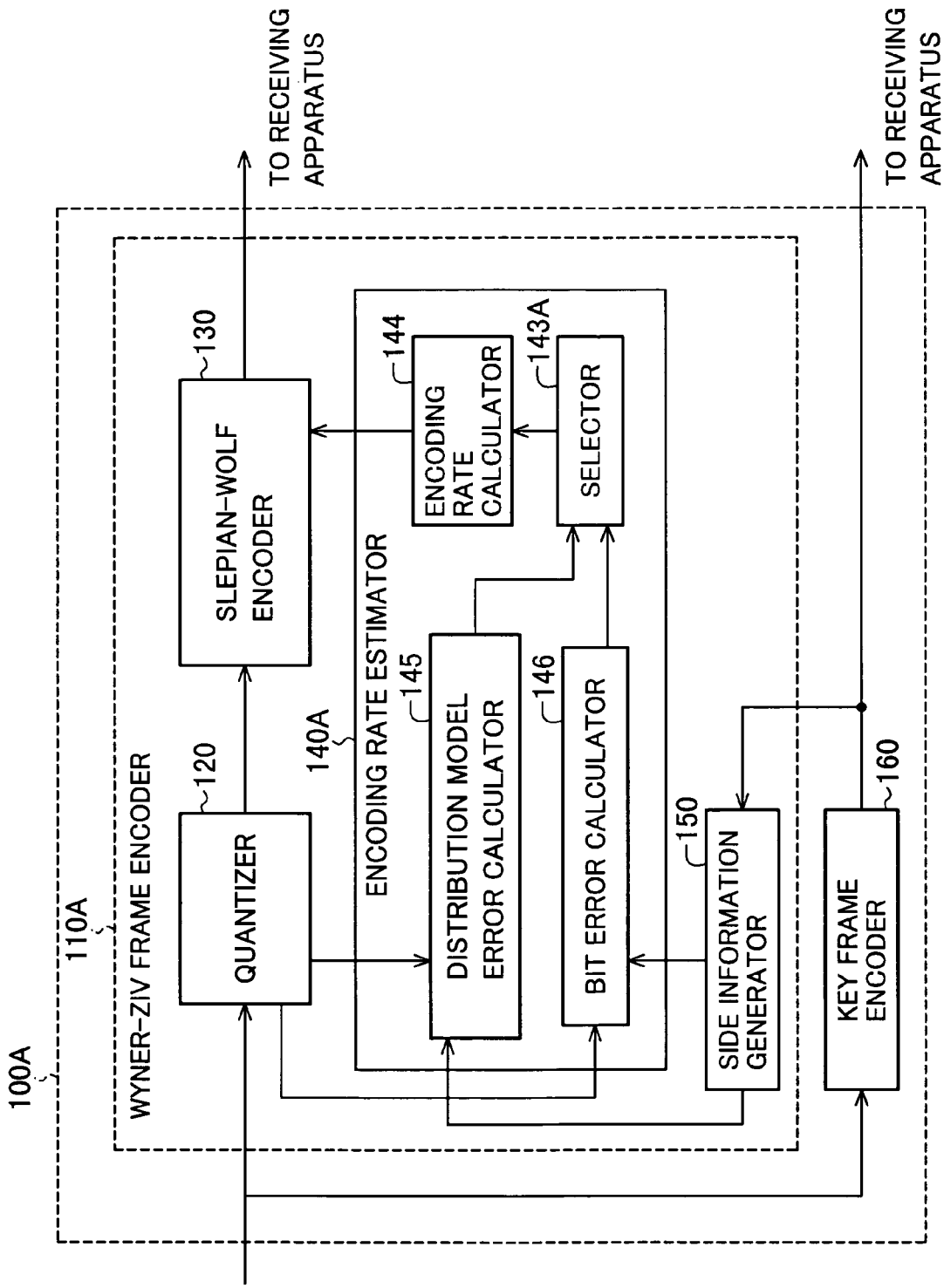
FIG. 6 is a functional block diagram illustrating the structure of a moving picture encoding apparatus in a second embodiment.

Referring again to FIG. 1, the moving picture distribution system 1A in the second embodiment has the same moving picture receiving apparatus 20 as in the first embodiment, but the moving picture distribution apparatus 10A includes a different moving picture encoding apparatus 100A. Referring to FIG. 6, the moving picture encoding apparatus 100A includes the same frame classifier 105 and key frame encoder 160 as in the first embodiment, but has a Wyner-Ziv frame encoder 110A including a different encoding rate estimator 140A. This encoding rate estimator 140A includes an encoding rate calculator 144 as in the first embodiment, but has a modified selector 143A and uses a new distribution model error calculator 145 and bit error calculator 146 in place of the distribution model entropy calculator and bit error entropy calculator used in the first embodiment.

The distribution model error calculator 145 obtains a bit plane of the transformed original image in the Wyner-Ziv frame from the quantizer 120 and the corresponding bit plane of the predicted image from the side information generator 150, and estimates the probable error rate in the bit plane by using a Laplacian distribution model as described in the first embodiment.

The bit error calculator 146 obtains a bit plane of the transformed original image in the Wyner-Ziv frame from the quantizer 120 and the corresponding bit plane of the predicted image from the side information generator 150, counts differences, representing prediction errors, between the two bit planes, and calculates the bit error rate, as in the first embodiment.

The selector 143A compares the probable error rate obtained from the distribution model error calculator 145 with the bit error rate obtained from the bit error calculator 146, decides which of the two error rates to use to calculate the encoding rate, calculates an entropy from the selected error rate, and sends the result to the encoding rate calculator 144.

The operation of the second embodiment will now be described with reference to the flowcharts in FIGS. 7 to 9. It will again be assumed that the frame sequence consists of odd-numbered key frames, which are encoded by conventional methods, and even-numbered Wyner-Ziv frames, which are encoded as follows.

Figure 7:
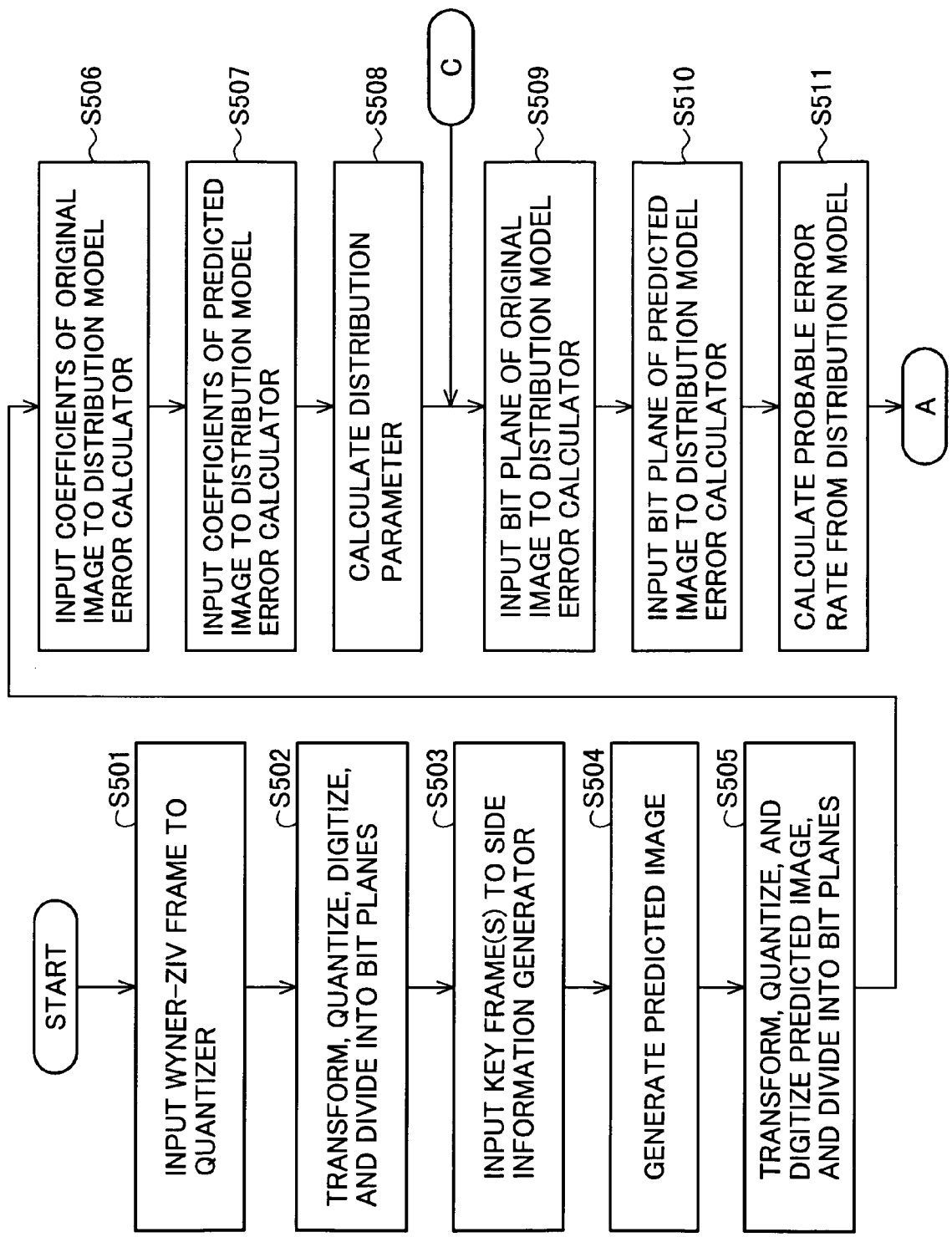
FIGS. 7 to 9 constitute a flowchart illustrating the operation of the moving picture encoding apparatus in FIG. 6.

The quantizer 120 transforms and quantizes each input Wyner-Ziv frame and divides the quantized data into bit planes; the side information generator 150 generates a predicted image; the predicted image is transformed and quantized, and divided into bit planes (steps S501 to S505 in FIG. 7). The same operations are performed in steps S501 to S505 as in steps S301 to S305 in the first embodiment, so descriptions will be omitted.

In the next few steps, the distribution model error calculator 145 calculates a probable error rate by estimating the number of prediction errors in the predicted image, on the assumption that the distribution of differences between the DCT coefficients of the original image and the predicted image can be approximately modeled by a Laplacian distribution.

The coefficients of the original image of the frame are input from the quantizer 120 to the distribution model error calculator 145 (step S506). The coefficients of the predicted image of the current frame are input from the side information generator 150 to the distribution model entropy calculator 145 (step S507).

The distribution model error calculator 145 calculates the parameter α of the Laplacian distribution for each band (step S508). The parameter α of the Laplacian distribution is related to the variance $\sigma^2$ of the distribution as in equation (1) in the first embodiment. If the mean value of the distribution is zero, the variance $\sigma^2$ can be calculated by equation (2) in the first embodiment, where X and Y represent coefficients derived from the original image and the predicted image, respectively, and N is the length of the bit plane.

A bit plane of the original image is now input from the quantizer 120 to the distribution model error calculator 145 (step S509). The corresponding bit plane of the predicted image is input from the side information generator 150 to the distribution model error calculator 145 (step S510). The distribution model error calculator 145 calculates a mean error probability or probable error rate by using the Laplacian distribution model (step S511). If X is a random variable representing a coefficient of the original image and Y is a random variable representing the corresponding coefficient of the predicted image, the conditional probability distribution of X for a given value of Y is calculated by equation (3), the bit error probability $P_r$ is calculated by equation (4), and the probable error rate $P_e$, is calculated by equation (5) as in the first embodiment.

Figure 8:
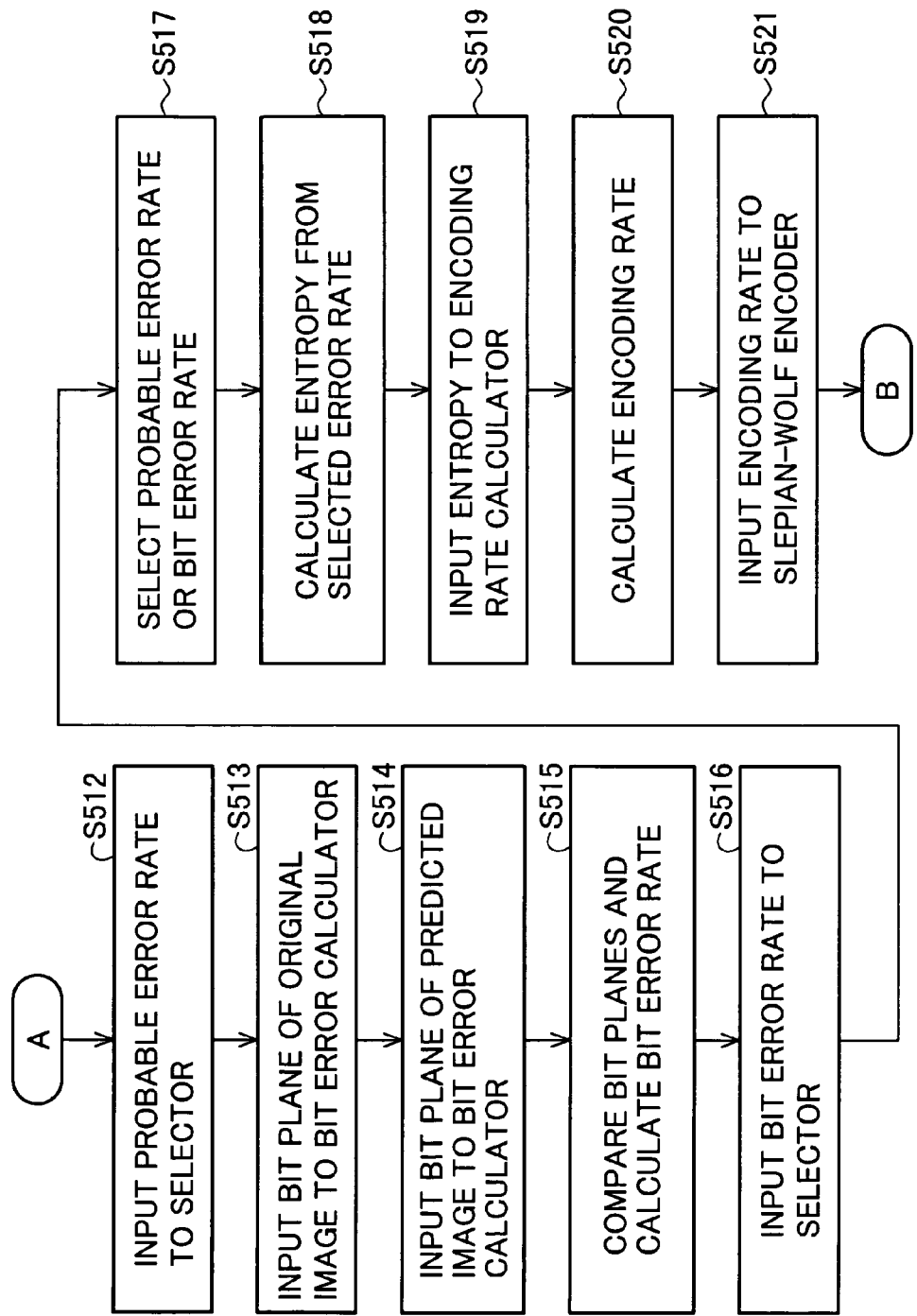
Figure 9:
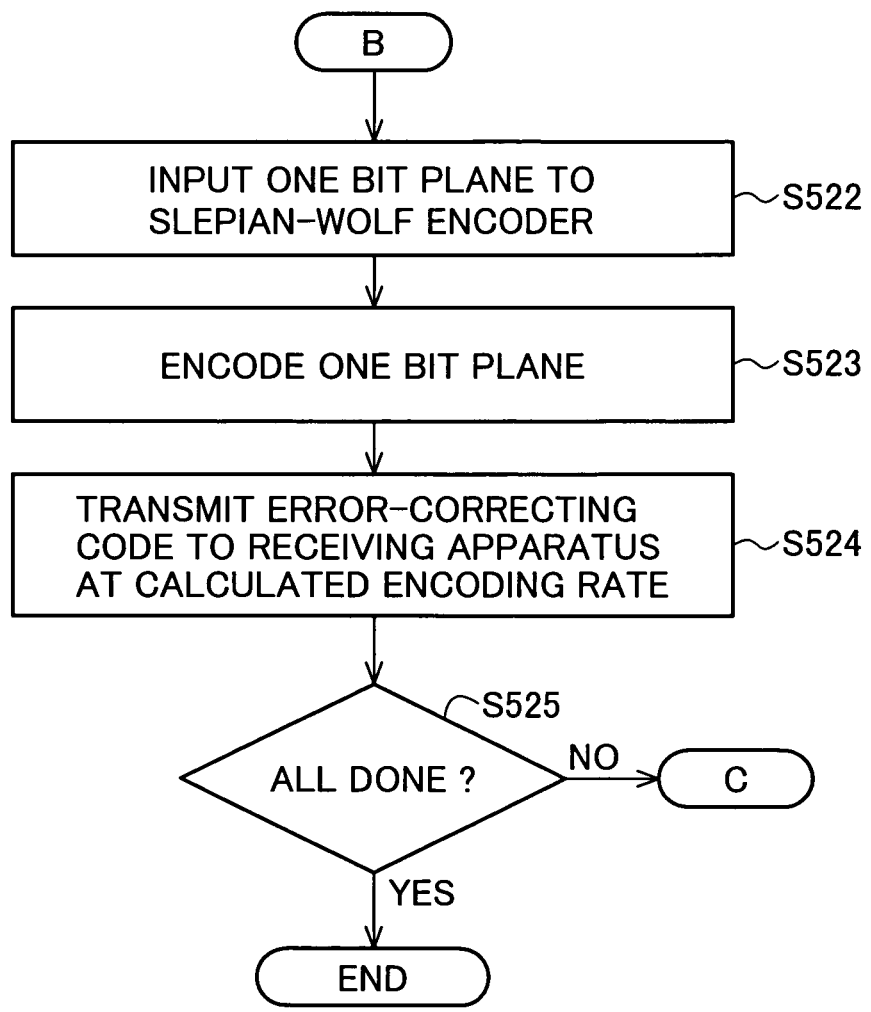

The probable error rate $P_e$, thus calculated from the distribution model is input to the selector 143A (step S512 in FIG. 8).

In the next few steps, the bit error calculator 146 calculates an error rate by a method different from the method used by the distribution model error calculator 145, in case more errors occur than envisioned by the Laplacian distribution model.

To calculate this error rate, the bit plane of the original image is input from the quantizer 120 to the bit error calculator 146 (step S513), and the corresponding bit plane of the predicted image is input from the side information generator 150 to the bit error calculator 146 (step S514). By comparing the original image and the predicted image, the bit error calculator 146 obtains a bit error count e. Dividing the bit error count e by the bit plane length N gives a bit error rate err (err=e/N) (step S515). This bit error rate is input to the selector 143A (step S516).

The selector 143A compares the bit error rate err obtained by counting bit errors with the probable error rate $P_e$, obtained from the distribution model, and decides whether the probable error rate $P_e$ provides an adequate encoding rate for decoding. If so, it selects the probable error rate given by the distribution model. Otherwise, it selects the counted bit error rate (step S517).

The probable error rate $P_e$ is based on an assumed general model representing an average error rate, while the bit error rate err is based on an actual comparison of the original and predicted images. If the bit error rate is greater than the distribution model error probability, it can be inferred that more errors will occur than predicted by the distribution model, and that the probable error rate given by the distribution model will not provide a sufficient encoding rate to enable the decoding apparatus to correct the errors.

The selector 143A may choose between the two supplied values on the basis of a simple comparison of their magnitudes, selecting the bit error rate err when condition (11) below is true and selecting the probable error rate $P_e$ when condition (11) is false. Instead of this simple comparison, a fixed or variable threshold t may be used as in the first embodiment, the bit error rate err being selected when condition (12) below is true or, alternatively, when condition (13) below is true.

$$P_e < \text{err} \tag{11}$$

$$\text{err} - P_e > t \tag{12}$$

$$\text{err}/P_e > t \tag{13}$$

Next, the selector 143A calculates an entropy value from the selected error rate (step S518). Using the symbol P to represent the selected error rate (err or $P_e$), the selector 143A obtains an entropy value H(P) from the equation (14) below, representing the encoding rate necessary for correcting errors occurring at rate P in a binary symmetric channel.

$$H(P) = -P\log(P) - (1-P)\log(1-P) \tag{14}$$

The subsequent steps are similar to steps S319 to S325 in the first embodiment. The entropy value H(P) calculated by the selector 143A is supplied to the encoding rate calculator 144 (step S519), which applies a correction to calculate the encoding rate (step S520). The calculated encoding rate is supplied to the Slepian-Wolf encoder 130 (step S521). The bit plane to be encoded is supplied from the quantizer 120 to the Slepian-Wolf encoder 130 (step S522 in FIG. 9) and encoded (step S523). The resulting error correcting code is output at the encoding rate obtained by the encoding rate estimator 140A and transmitted to the moving picture decoding apparatus 200 (step S524). The Wyner-Ziv frame encoder 110A determines whether all bit planes of the current frame have been processed (step S525). If so, processing of the frame ends. Otherwise, the processing returns to step S509.

The second embodiment provides a further reduction in the encoding processing load, because an entropy value is calculated only from the selected error rate, either the probable error rate calculated by the distribution model error calculator 145 or the bit error rate calculated by the bit error calculator 146, whereas the first embodiment always calculates entropy values from both error rates.

Third Embodiment

Figure 10:
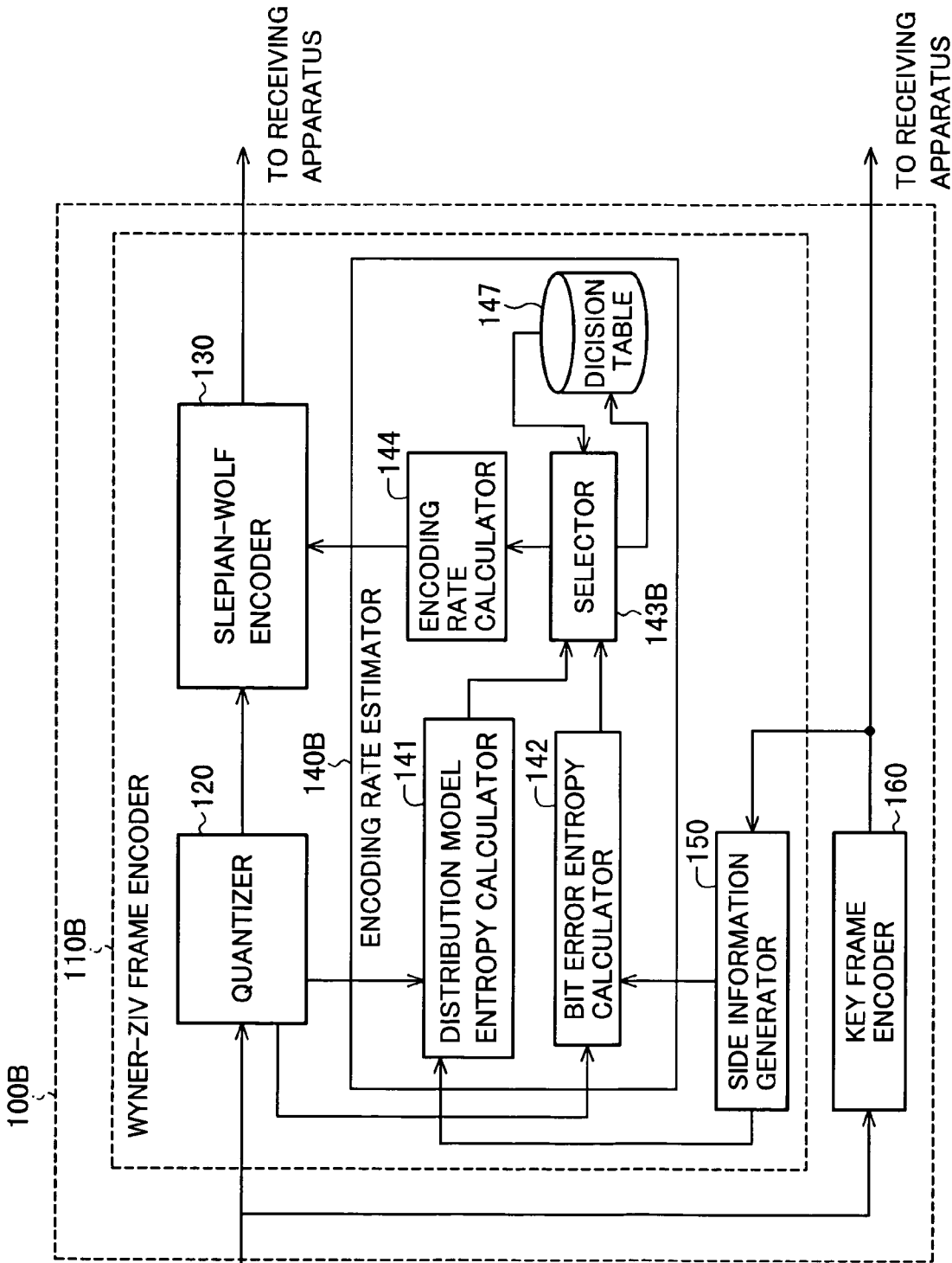
FIG. 10 is a functional block diagram illustrating the structure of a moving picture encoding apparatus in a third embodiment.

Referring once again to FIG. 1, the moving picture distribution system 1B in the third embodiment has the same moving picture receiving apparatus 20 as in the first embodiment, but the moving picture distribution apparatus 10B includes a different moving picture encoding apparatus 100B. Referring to FIG. 10, the moving picture encoding apparatus 100B includes the same frame classifier 105 and key frame encoder 160 as in the first embodiment, but has a Wyner-Ziv frame encoder 110B including a different encoding rate estimator 140B. The encoding rate estimator 140B has generally the same structure as the encoding rate estimator in the first embodiment, but includes a different selector 143B and has an additional decision table 147.

The decision table 147 stores precalculated decision results indicating whether to base the encoding rate on the entropy value obtained from the distribution model entropy calculator 141 or the entropy value obtained from the bit error entropy calculator 142.

The selector 143B in the third embodiment differs from the selector in the first embodiment in that it refers to the decision table 147 to decide which of the two entropy values to use.

The operation of the third embodiment will now be described with reference to the flowcharts in FIGS. 11 to 13. It will again be assumed that the frame sequence consists of odd-numbered key frames, which are encoded by conventional methods, and even-numbered Wyner-Ziv frames, which are encoded as follows.

Figure 11:
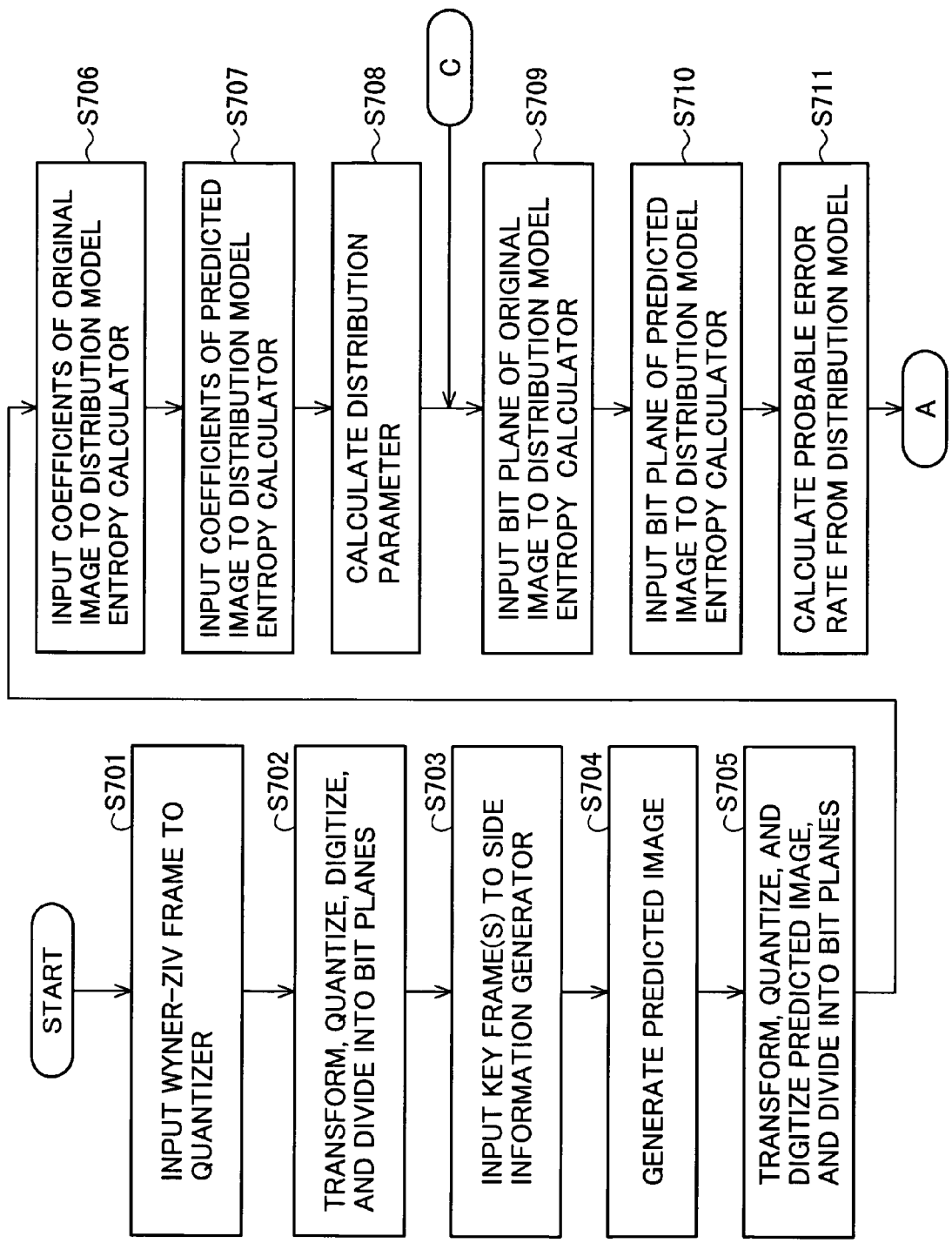
FIGS. 11 to 13 constitute a flowchart illustrating the operation of the moving image encoding apparatus in FIG. 10.
Figure 12:
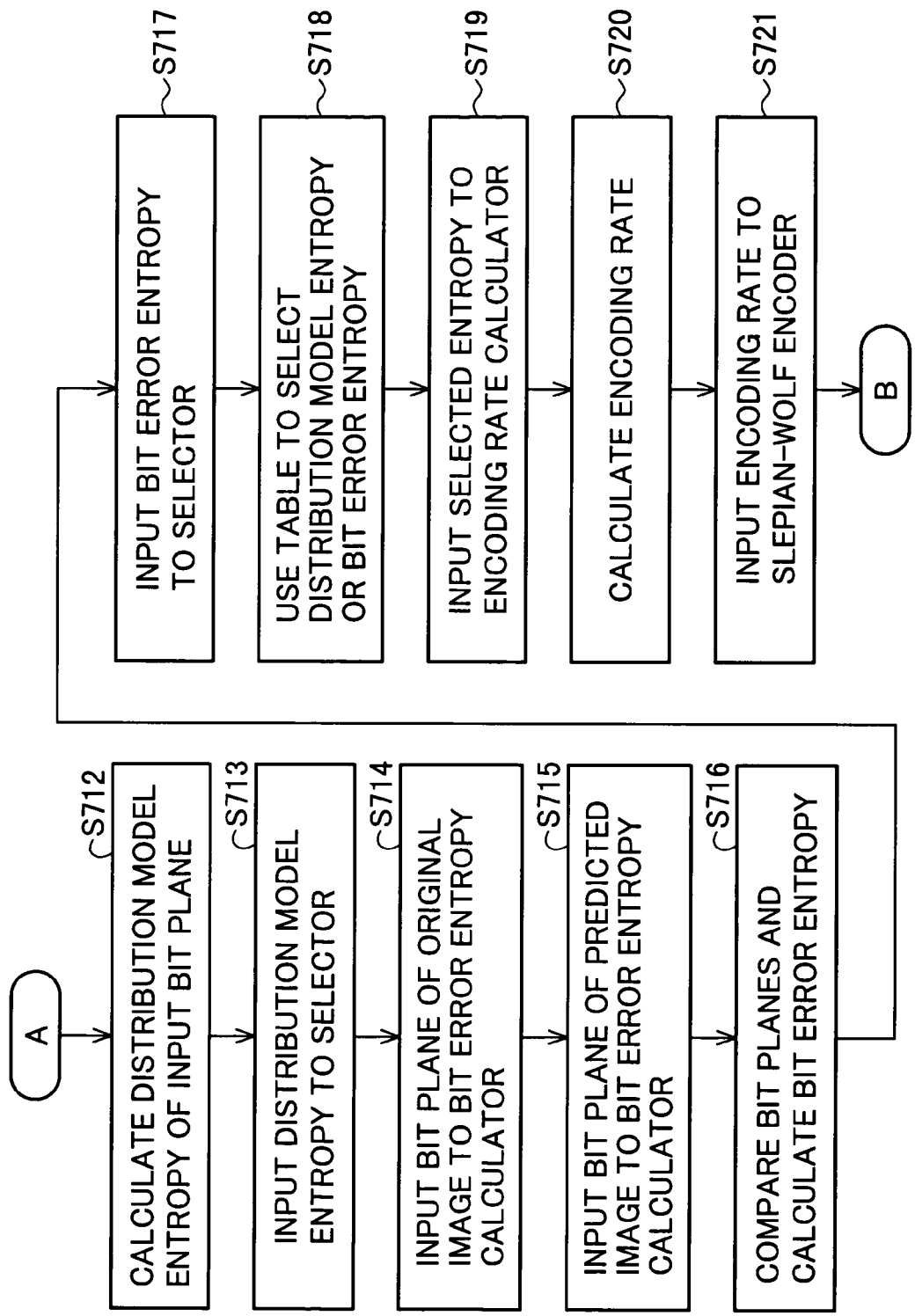
Figure 13:
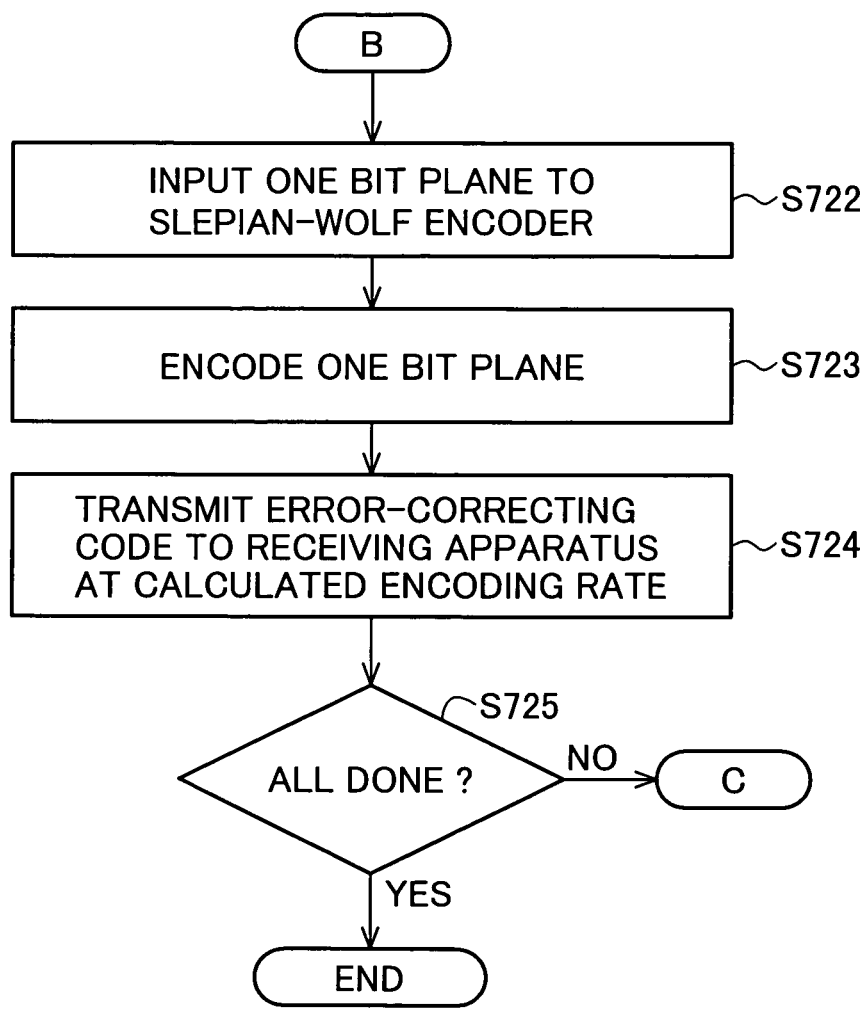

The same operations are performed in steps S701 to S712 in FIGS. 11 and 12 as in steps S301 to S312 in the first embodiment, so descriptions will be omitted.

The distribution model entropy value calculated by the distribution model entropy calculator 141, using the Laplacian distribution model, is input to the selector 143B (step S713 in FIG. 12).

The bit error entropy calculator 142 calculates an entropy value by a different method, not using a distribution model. The bit plane of the original image is input from the quantizer 120 to the bit error entropy calculator 142 (step S714); the corresponding bit plane of the predicted image is input from the side information generator 150 to the bit error entropy calculator 142 (step S715); the bit error entropy calculator 142 compares the two received bit planes, counts differences to obtain a bit error count e, divides the bit error count e by the bit plane length N to obtain a bit error rate err (err=e/N), and calculates a bit error entropy value H(err) as in equation (7) in the first embodiment (step S716). The bit error entropy is input from the bit error entropy calculator 142 to the selector 143B (step S717).

The selector 143B refers to the decision table 147 to decide whether to use the distribution model entropy $H(P_e)$ or the bit error entropy H(err) to calculate the encoding rate (step S718). The selected entropy value is input to the encoding rate calculator 144 (step S719).

For each possible pair of distribution model entropy and bit error entropy values, the decision table 147 stores a predetermined decision result indicating which of the two entropy values should be used to calculate the encoding rate. These decision results may be predetermined from one of the magnitude criteria (8) to (10) given in the first embodiment.

The encoding rate calculator 144 applies a correction to the input entropy value to calculate an encoding rate from the selected entropy value (step S720) and supplies the calculated encoding rate to the Slepian-Wolf encoder 130 (step S721). The bit plane to be encoded is input from the quantizer 120 to the Slepian-Wolf encoder 130 (step S722 in FIG. 13) and encoded (step S723), and the Slepian-Wolf encoder 130 outputs an error-correcting code at the encoding rate determined by the encoding rate estimator 140B (step S724). The Wyner-Ziv frame encoder 110B decides whether all bit planes of the current frame have been processed (step S725). If so, the processing of the frame ends. Otherwise, the Wyner-Ziv frame encoder 110B returns to step S709 to process the next bit plane.

The third embodiment also reduces the amount of encoding processing, because the decision table 147 stores precalculated decision results indicating whether to base the encoding rate on the distribution model entropy value or the bit error entropy value, thereby saving decision-making time.

Fourth Embodiment

Figure 14:
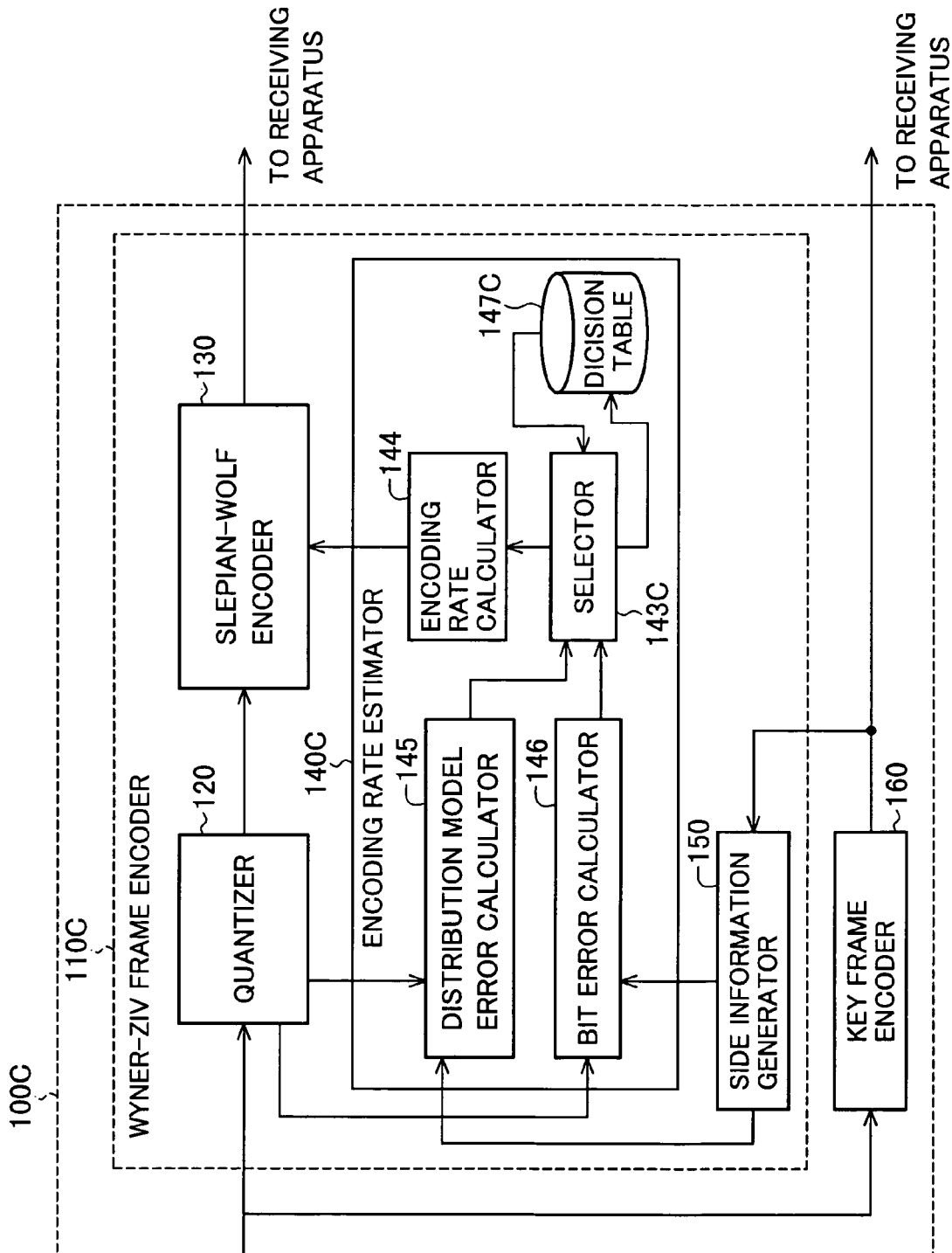
FIG. 14 is a functional block diagram illustrating the structure of a moving picture encoding apparatus in a fourth embodiment.

Referring yet again to FIG. 1, the moving picture distribution system 10 in the fourth embodiment also has the same moving picture receiving apparatus 20 as in the first embodiment, but the moving picture encoding apparatus 10C includes a different moving picture encoding apparatus 100C. Referring FIG. 14, the moving picture encoding apparatus 100C includes the same frame classifier 105 and key frame encoder 160 as in the first embodiment, but has a Wyner-Ziv frame encoder 110C including a different encoding rate estimator 140C. The encoding rate estimator 140C has generally the same structure as the encoding rate estimator 140A in the second embodiment, but includes a modified selector 143C and a decision table 147C.

The decision table 147C stores precalculated entropy values or decision results that can be read according to the probable error rate obtained by the distribution model error calculator 145 and the bit error rate obtained by the bit error calculator 146.

The selector 143C refers to the decision table 147C to select either the probable error rate or the bit error rate as the basis for calculation of the encoding rate.

The operation of the third embodiment will now be described with reference to the flowcharts in FIGS. 15 to 17. It will again be assumed that the frame sequence consists of odd-numbered key frames, which are encoded by conventional methods, and even-numbered Wyner-Ziv frames, which are encoded as follows.

Figure 15:
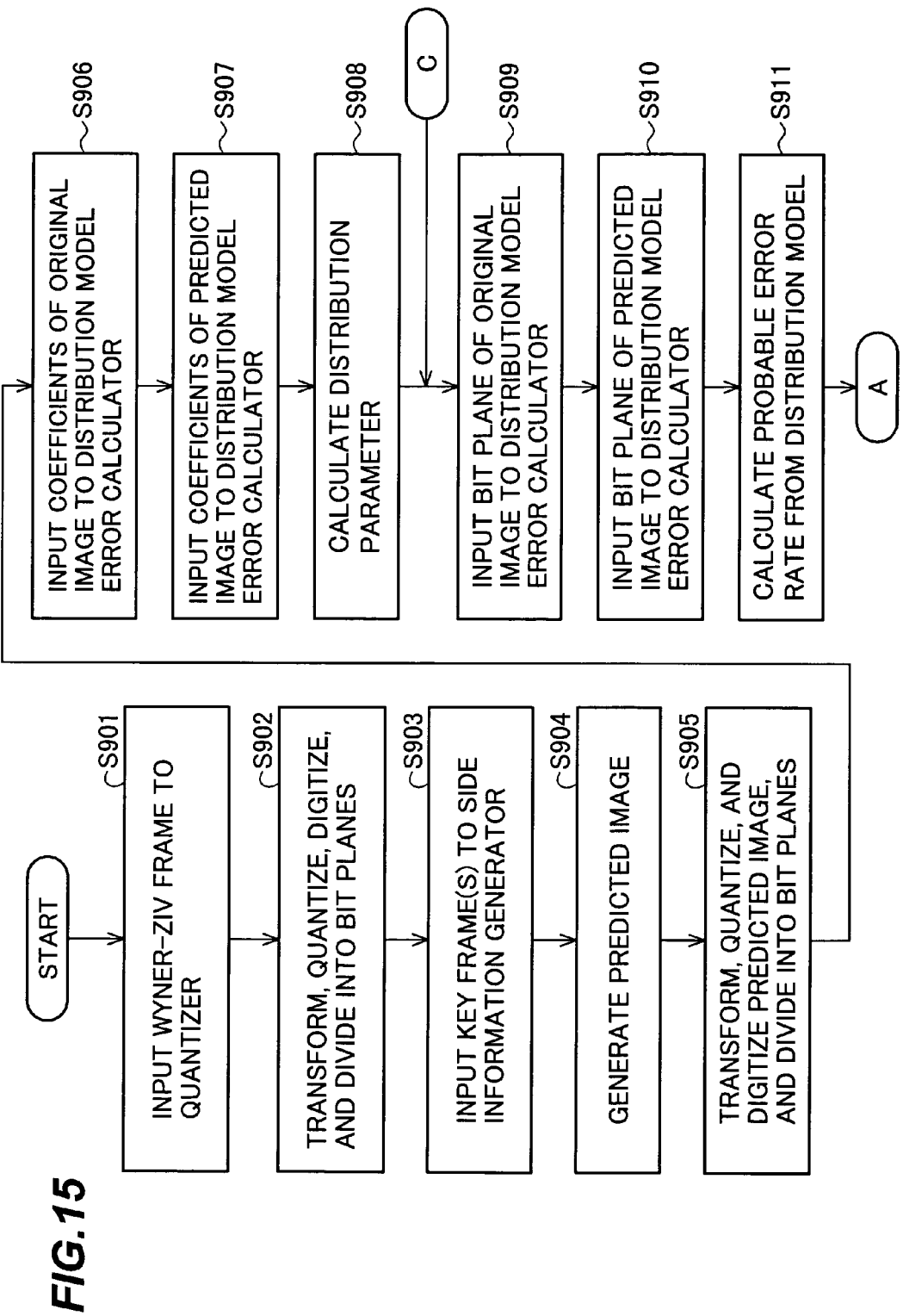
FIGS. 15 to 17 constitute a flowchart illustrating the operation of the moving picture encoding apparatus in FIG. 14.

The same operations are performed in steps S901 to S911 in FIG. 15 as in steps S501 to S511 in the second embodiment, so descriptions will be omitted.

Figure 16:
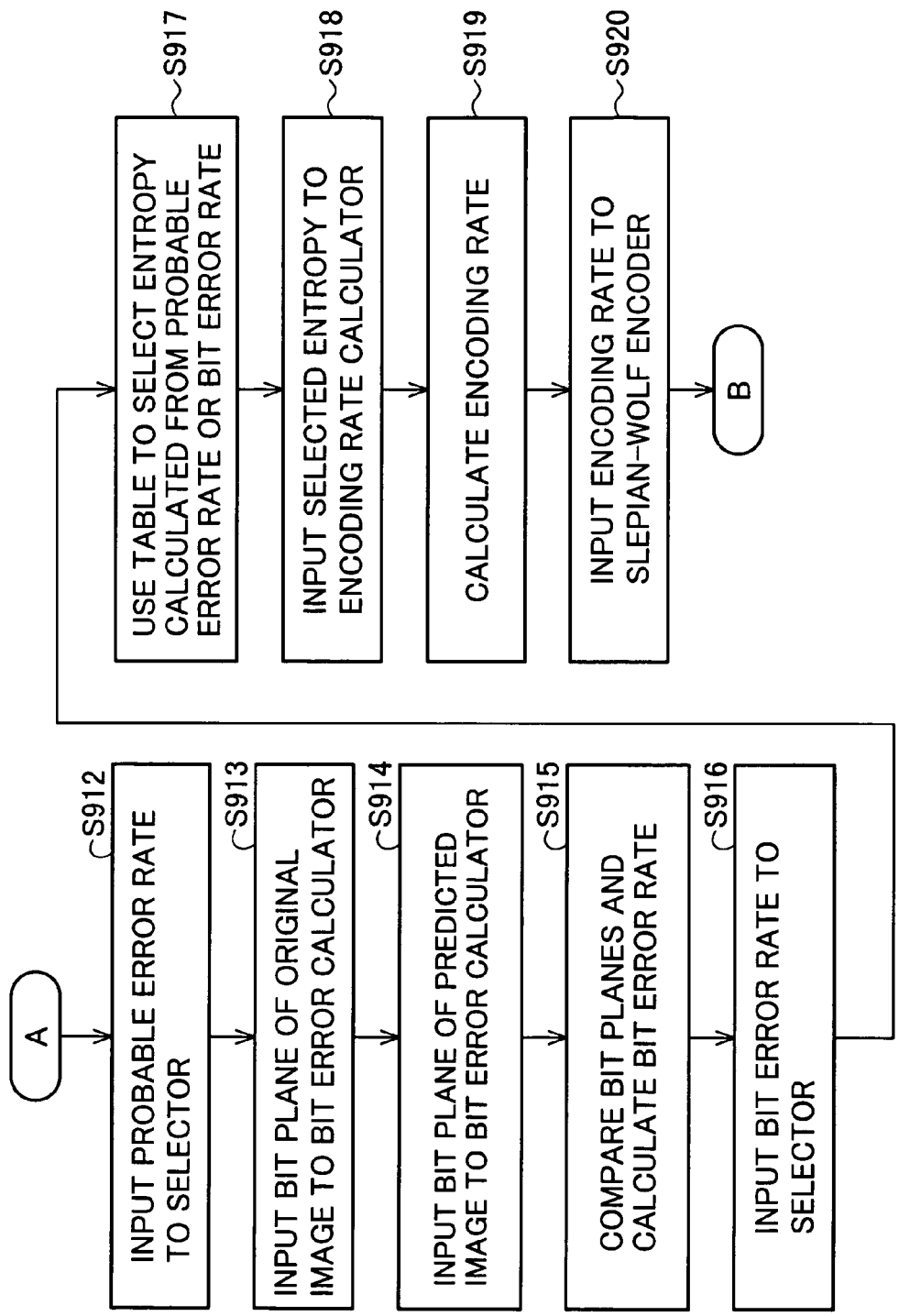
Figure 17:
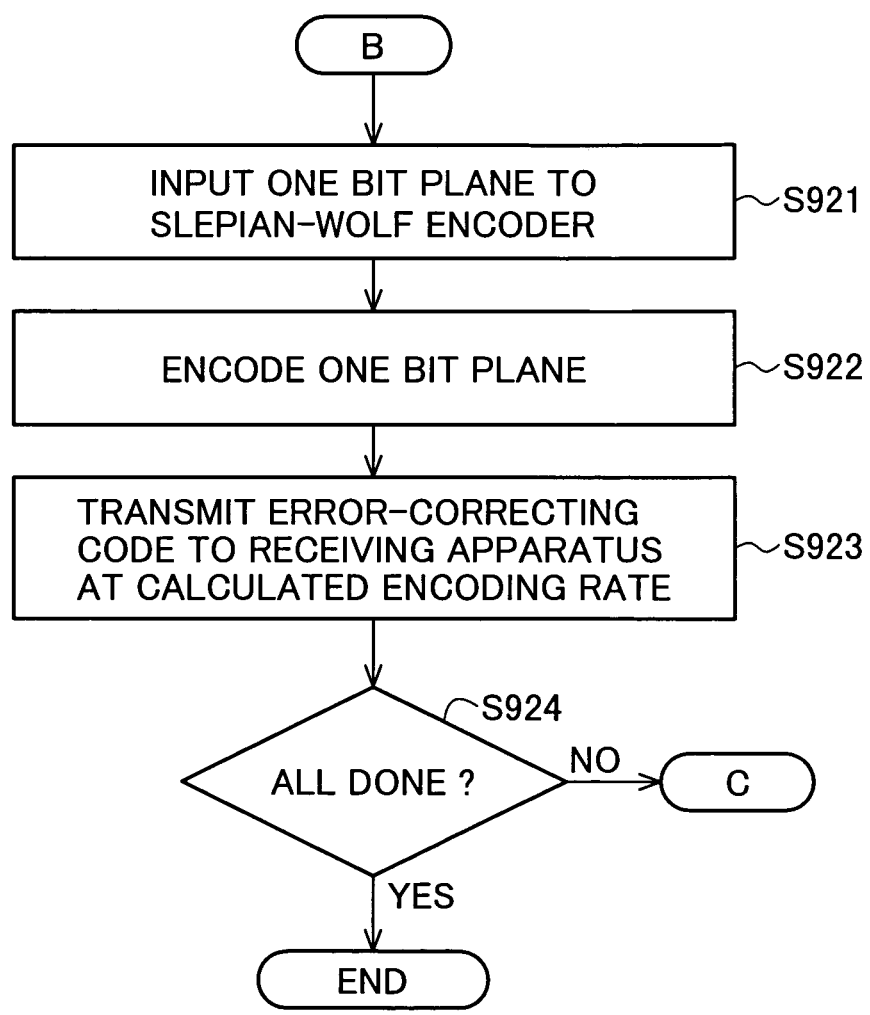

The probable error rate calculated from the distribution model by the distribution error calculator 145 is input to the selector 143C (step S912 in FIG. 16).

Next, the bit plane of the original image is input from the quantizer 120 to the bit error calculator 146 (step S913); the corresponding bit plane of the predicted image is input from the side information generator 150 to the bit error calculator 146 (step S914); the bit error calculator 146 compares the two received bit planes, counts differences to obtain a bit error count e, and divides the bit error count e by the bit plane length N to obtain a bit error rate err (err=e/N) (step S915). The bit error rate err is input from the bit error calculator 146 to the selector 143C (step S916).

By referring to the decision table 147C, the selector 143C decides whether to use the probable error rate $P_e$ given by the distribution model or the bit error rate err obtained by counting to calculate the encoding rate and obtains an entropy value calculated by the selected method (step S917).

For each possible pair of distribution model error probability ($P_e$) and bit error rate (err) values, the decision table 147 stores an entropy value calculated from one of the two values. The value ($P_e$ or err) from which the entropy value is calculated is separately predetermined for each pair of input values ($P_e$ and err). The predetermination may be made from one of the magnitude criteria (11) to (13) given in the second embodiment.

In variation of the fourth embodiment, instead of storing entropy values, the decision table 147C only stores information indicating which error rate ($P_e$ or err) should be used to calculate the entropy value, and the selector 143C calculates the entropy value, as in the second embodiment, from the error rate indicated by the decision table 147C.

The entropy value obtained by the selector 147C is input to the encoding rate calculator 144 (step S918). The operations performed in the following steps (S919 to S924) in FIGS. 16 and 17 are the same as the operations in steps S520 to S525 in the second embodiment, so descriptions will be omitted.

Compared with the second embodiment, the fourth embodiment further reduces the amount of encoding processing, because the decision table 147C stores precalculated entropy values, which saves calculation time, or predetermined decision results indicating which error rate to use to calculate the entropy value, which saves decision-making time.

Other Embodiments

The present invention is not limited to the embodiments described above. The following are some of the possible modifications.

In FIG. 1, the moving picture encoding apparatus is shown as part of a moving picture distribution apparatus. The moving picture encoding apparatus may, however, be a stand-alone apparatus for the output of encoded data generated from an input sequence of frames. The output may take the form of storage of the encoded data in a disk drive or other storage medium, or output of the encoded data to another apparatus.

Although the encoding rate estimators in the moving picture encoding apparatus in the first and third embodiments have a distribution model error entropy calculator and a bit error entropy calculator, other embodiments may have different types of entropy calculators in addition to or instead of these two entropy calculators. The number of entropy calculators and the calculation methods employed are not limited, provided the encoding rate estimator includes a plurality of entropy calculators for calculating entropy values by different calculation methods and uses one of the calculated entropy values to obtain the encoding rate.

Similarly, the number of error rate calculators and the calculation methods employed in the second and fourth embodiments are not limited, provided the encoding rate estimator includes a plurality of error rate calculators for calculating error rate values by different methods, calculates an entropy value from one of the calculated error rates, and uses the entropy value to obtain the encoding rate.

Those skilled in the art will recognize that further variations are possible within the scope of the invention, which is defined in the appended claims.

What is claimed is:

1. A moving picture encoding apparatus for encoding a moving picture signal including a sequence of frames, the moving picture encoding apparatus comprising:
    a frame classifier for designating each frame in the sequence as a key frame or a non-key frame;
    a key frame encoder for encoding the designated key frames in the sequence to generate encoded key frame data;
    a side information generator for using the encoded key frame data to generate a predicted image for each designated non-key frame in the sequence;
    an encoding rate estimator for determining an encoding rate for said each designated non-key frame by estimating a number of error-correcting bits needed to correct prediction errors in the predicted image generated for said each designated non-key frame; and
    a non-key frame encoder for encoding said each designated non-key frame to obtain an error-correcting code at the encoding rate determined by the encoding rate estimator, and outputting the error-correcting code as encoded data of said each designated non-key frame;
    wherein the encoding rate estimator includes
        a distribution model entropy calculator configured to calculate a distribution model entropy value from a model that approximates a relation between said each designated non-key frame and the predicted image,
        a bit error entropy calculator configured to compare said each designated non-key frame with the predicted image to determine a difference therebetween, and to calculate a bit error entropy value from the difference,
        a selector configured to select one of the bit error entropy value and the distribution model entropy value as a selected entropy value, the bit error entropy value being selected when it is larger than the distribution model entropy value, and
        an encoding rate calculator configured to calculate the encoding rate from the selected entropy value.

2. The moving picture encoding apparatus of claim 1, wherein the selector selects the bit error entropy value when the bit error entropy value is larger, by a margin, than the distribution model entropy value.

3. The moving picture encoding apparatus of claim 1, wherein the selector selects the bit error entropy value when $$H(err)-H(P_e)>t$$

where
    H(err) denotes the bit error entropy value,
    $H(P_e)$ denotes the distribution model entropy value, and
    t denotes a threshold.

4. The moving picture encoding apparatus of claim 1, wherein the selector selects the bit error entropy value when $$H(err)/H(P_e)>t$$

where
    H(err) denotes the bit error entropy value,
    $H(P_e)$ denotes the distribution model entropy value, and
    t denotes a threshold.

5. A machine-readable non-transitory medium storing a program executable by a computing device to encode a moving picture signal including a sequence of frames, the program including instructions for:
designating each frame in the sequence as a key frame or a non-key frame;
encoding the designated key frames in the sequence to generate encoded key frame data;
using the encoded key frame data to generate a predicted image for each designated non-key frame in the sequence;
calculating a distribution model entropy value from a model that approximates a relation between said each designated non-key frame and the predicted image;
comparing said each designated non-key frame with the predicted image to determine a difference therebetween and to calculate a bit error entropy value from the difference;
selecting one of the bit error entropy value and the distribution model entropy value as a selected entropy value, the bit error entropy value being selected when it is larger than the distribution model entropy value;
using the selected entropy value to calculate an encoding rate for said each designated non-key frame in the sequence; and
encoding said each designated non-key frame in the sequence to generate encoded non-key frame data at the encoding rate calculated for said each designated non-key frame.

6. A moving picture distribution system comprising:
a moving picture distribution apparatus including the moving picture encoding apparatus of claim 1; and
a moving picture receiving apparatus including a moving picture decoding apparatus for receiving the encoded key frame data and the encoded data of said each designated non-key frame and decoding the encoded key frame data and the encoded data of said each designated non-key frame.

7. A moving picture encoding apparatus for encoding a moving picture signal including a sequence of frames, the moving picture encoding apparatus comprising:
a frame classifier for designating each frame in the sequence as a key frame or a non-key frame;
a key frame encoder for encoding the designated key frames in the sequence to generate encoded key frame data;
a side information generator for using the encoded key frame data to generate a predicted image for each designated non-key frame in the sequence;
an encoding rate estimator for determining an encoding rate for said each designated non-key frame by estimating a number of error-correcting bits needed to correct prediction errors in the predicted image generated for said each designated non-key frame; and
a non-key frame encoder for encoding said each designated non-key frame to obtain an error-correcting code at the encoding rate determined by the encoding rate estimator, and outputting the error-correcting code as encoded data of said each designated non-key frame;
wherein the encoding rate estimator includes
a distribution model error calculator configured to calculate a distribution model error rate from a model that approximates a relation between said each designated non-key frame and the predicted image,
a bit error calculator configured to compare said each designated non-key frame with the predicted image to determine a difference therebetween and to calculate a bit error rate from the difference,
a selector configured to select one of the bit error rate and the distribution model error rate as a selected error rate, and to calculate an entropy value from the selected error rate, the bit error rate being selected when it is larger than the distribution model error rate, and
an encoding rate calculator configured to calculate the encoding rate from the entropy value calculated by the selector.

8. The moving picture encoding apparatus of claim 7, wherein the selector selects the bit error rate when the bit error rate is larger, by a margin, than the distribution model error rate.

9. The moving picture encoding apparatus of claim 7, wherein the selector selects the bit error rate when $$\text{err} - P_e > t$$

where
err denotes the bit error rate,
$P_e$ denotes the distribution model error rate, and
t denotes a threshold.

10. The moving picture encoding apparatus of claim 7, wherein the selector selects the bit error rate when $$\text{err}/P_e > t$$

where
err denotes the bit error rate,
$P_e$ denotes the distribution model error rate, and
t denotes a threshold.

11. A moving picture encoding apparatus for encoding a moving picture signal including a sequence of frames, the moving picture encoding apparatus comprising:
a frame classifier for designating each frame in the sequence as a key frame or a non-key frame;
a key frame encoder for encoding the designated key frames in the sequence to generate encoded key frame data;
a side information generator for using the encoded key frame data to generate a predicted image for each designated non-key frame in the sequence;
an encoding rate estimator for determining an encoding rate for said each designated non-key frame by estimating a number of error-correcting bits needed to correct prediction errors in the predicted image generated for said each designated non-key frame; and
a non-key frame encoder for encoding said each designated non-key frame to obtain an error-correcting code at the encoding rate determined by the encoding rate estimator, and outputting the error-correcting code as encoded data of said each designated non-key frame;
wherein the encoding rate estimator includes
a distribution model entropy calculator configured to calculate a distribution model entropy value from a model that approximates a relation between said each designated non-key frame and the predicted image,
a bit error calculator configured to compare said each designated non-key frame with the predicted image to determine a difference therebetween and to calculate a bit error entropy value from the difference,
a decision table configured to store information indicating which one of the distribution model entropy value and the bit error entropy value is to be selected as a selected entropy value, the bit error entropy value being to be selected when it is larger than the distribution model entropy value, a selector configured to select the selected entropy value according to the information stored by the decision table, and an encoding rate calculator configured to calculate the encoding rate from the selected entropy value selected by the selector.

12. The moving picture encoding apparatus of claim 11, wherein the information stored in the decision table indicates that the bit error entropy value should be selected when the bit error entropy value is larger, by a margin, than the distribution model entropy value.

13. The moving picture encoding apparatus of claim 11, wherein the information stored in the decision table indicates that the bit error entropy value should be selected when $$H(\text{err})-H(P_e)>t$$

where
H(err) denotes the bit error entropy value,
$H(P_e)$ denotes the distribution model entropy value, and
t denotes a threshold.

14. The moving picture encoding apparatus of claim 11, wherein the information stored in the decision table indicates that the bit error entropy value should be selected when $$H(\text{err})/H(P_e)>t$$

where
H(err) denotes the bit error entropy value,
$H(P_e)$ denotes the distribution model entropy value, and
t denotes a threshold.

15. A moving picture encoding apparatus for encoding a moving picture signal including a sequence of frames, the moving picture encoding apparatus comprising:
- a frame classifier for designating each frame in the sequence as a key frame or a non-key frame;
- a key frame encoder for encoding the designated key frames in the sequence to generate encoded key frame data;
- a side information generator for using the encoded key frame data to generate a predicted image for each designated non-key frame in the sequence;
- an encoding rate estimator for determining an encoding rate for said each designated non-key frame by estimating a number of error-correcting bits needed to correct prediction errors in the predicted image generated for said each designated non-key frame; and
- a non-key frame encoder for encoding said each designated non-key frame to obtain an error-correcting code at the encoding rate determined by the encoding rate estimator, and outputting the error-correcting code as encoded data of said each designated non-key frame;

wherein the encoding rate estimator includes
- a distribution model error calculator configured to calculate a distribution model error rate from a model that approximates a relation between said each designated non-key frame and the predicted image,
- a bit error calculator configured to compare said each designated non-key frame with the predicted image to determine a difference therebetween and to calculate a bit error rate from the difference,
- a decision table configured to store information indicating which one of the distribution model error rate and the bit error rate is to be selected as a selected error rate, the bit error rate being to be selected when it is larger than the distribution model error rate,
- a selector configured to select the selected error rate according to the information stored by the decision table, and to calculate an entropy value from the selected error rate, and
- an encoding rate calculator configured to calculate the encoding rate from the entropy value calculated by the selector.

16. The moving picture encoding apparatus of claim 15, wherein the information stored in the decision table indicates that the bit error rate should be selected when the bit error rate is larger, by a margin, than the distribution model error rate.

17. The moving picture encoding apparatus of claim 15, wherein the information stored in the decision table indicates that the bit error rate should be selected when $$\text{err}-P_e>t$$

where
err denotes the bit error rate,
$P_e$ denotes the distribution model error rate, and
t denotes a threshold.

18. The moving picture encoding apparatus of claim 15, wherein the information stored in the decision table indicates that the bit error rate should be selected when $$\text{err}/P_e>t$$

where
err denotes the bit error rate,
$P_e$ denotes the distribution model error rate, and
t denotes a threshold.

* * * * *